March 7, 1967 M. KAPLOW 3,307,736
VACUUM SEALABLE CONTAINER FOR HYDRATABLE PRODUCTS
Filed May 22, 1964

INVENTOR.
MILTON KAPLOW
BY
ATTORNEY

United States Patent Office 3,307,736
Patented Mar. 7, 1967

3,307,736
VACUUM SEALABLE CONTAINER FOR
HYDRATABLE PRODUCTS
Milton Kaplow, Elmsford, N.Y., assignor to General
Foods Corporation, White Plains, N.Y., a corporation
of Delaware
Filed May 22, 1964, Ser. No. 369,371
15 Claims. (Cl. 220—54)

This invention relates generally to containers adaptable for packing a product under vacuum, the invention relating more particularly to containers of this type provided with easy opening means effective for breaking the vacuum seal at a discrete location on said container while being maintained submerged below the surface of a product hydrating liquid.

The invention has particular utility for the packaging of liquid combinable products intended to be hydrated under the forced hydration process disclosed in the pending application of Murray L. Rollins S.N. 396,367, filed February 11, 1964, and having common ownership herewith. As disclosed in the aforesaid application, dried fruits, vegetables, beverages and other liquid combinable products intended to be hydrated and heated, or simply hydrated as product, offer a considerable advantage to the manufacturer as well as to the consumer. The manufacturer enjoys savings in weight and cost of distribution in the case of a substantially dehydrated or dry hydratable product. The product per se is usually hydratable to a preferred quality in terms of flavor, color, concentration and other values. The ability to control these qualities is appreciated by most consumers.

The term "hydrating" as applied herein is intended to denote the combining with or impregnation of products by a liquid substance such as water. The term is intended to include the saturation or wetting of a nonsoluble solid which has been dehydrated under any possible condition, whether it be under atmospheric pressure, a vacuum, or while in a frozen state. The term also includes the impregnation of solids having soluble elements which are extracted from the solid to become infused with the liquid, such products being ground coffee, tea, or the like. The term is also intended to include the combining of liquid with a soluble product which has been either dehydrated so as to be in the form of a dry powder such as is now commonly known as instant (soluble) coffee, tea, or the like or which is a soluble substance or combination of dry ingredients not previously dehydrated, such as artificial fruit juices or the like.

By the same token, the terminology "liquid combinable" is intended to embrace all products which when combined with a liquid results in or produces a product of the desired consistency, whether it be a dehydrated nonsoluble solid, a solid having soluble elements extractable by the liquid, or a soluble solid which may be either a liquid in dehydrated form or a dry substance or a mixture of ingredients which is completely solubilized when combined with a hydrating liquid such as water or the like.

In accordance with the forced hydration or reconstitution concept of the aforesaid pending application, the liquid combinable product is packaged in a vacuum within a vacuum sealed container. When ready for use, the vacuum seal of the container, at a discrete area in the structure of the container, is broken while in liquid tight communication with the hydrating liquid. Consequently, the hydrating liquid is forced under atmospheric pressure into the container and into the minute voids or interstices within the individual specimens of the product as well as between the voids existing between the individual specimens of the product. In the case of products adapted to be heated for use, the hydrating liquid may be preheated so as to elevate the temperature of the product incident to the hydration thereof. The process has been found to be particularly advantageous with respect to hydratable food products, especially freeze dried food products, although it should be understood that the process has useful applicability to products other than those in the food category.

In accordance with the present invention, a vacuum sealable container is provided with means effective for readily releasing the vacuum in the container at a discrete location on the container's surface. Preferably, the vacuum release means is disposed so as to effect an opening at one end of the container while held submerged in a hydrating liquid. This enables the opposite end of the container to be handled or held at a point above the level of the hydrating liquid. For example, the invention may utilize a cylindrical rigid container or can having an end closure of the type now commonly referred to as the "Whirlaway" closure wherein a protruding rivet is provided and has attached thereto a pull tab which, by application of manual force thereon, causes the material of the end closure to fracture or rupture at the rivet. The so-called "Whirlaway" feature also comprises appropriate partial scoring of the material of the end closure to define a tear strip running from the point of rupture to the perimeter of the end closure and thence peripherally around the end closure so as to enable complete removal of the closure from the container by continued application of force on the pull tab.

Such an end closure as above referred to may be considered as the outer or primary seal for the vacuumized container. In accordance with the invention an inner or secondary seal is also provided to maintain the container contents under vacuum, at least temporarily, after the fracture or rupture of the aforesaid end closure constituting the primary seal. The secondary seal is disposed at the same end of the container as the primary sealing end closure and may be attached thereto at the inner surface thereof, said secondary seal being formed of a material which when in the presence of the hydrating liquid, is susceptible to physical change so as to become ineffective as a sealing medium. Said material may, for example, be film of a water-soluble substance, such as amylose starch or the like. Or, in applications wherein the nature of the contained product calls for heating thereof concurrently with its hydration, which may advantageously be accomplished by employment of a heated hydrating liquid, the material of the secondary seal might comprise a film of heat-shrinkable substance such as polyvinylidene chloride, or the like.

In use, the end closure of the container constituting the primary vacuum seal is ruptured or fractured preferably just prior to the time at which it is desired to hydrate the container contents. This is easily accomplished by manipulation of the pull tab in the manner above described. Thereafter, the end of the container provided with the aforesaid frangible end closure is submerged in a body of hydrating liquid which penetrates the end closure through the fractured or ruptured portion to thereby come in contact with the secondary vacuum seal. The secondary seal thereupon either dissolves or shrinks, as the case may be, thereby completely breaking the seal for the container contents and permitting entry of the hydrating liquid into the product-containing area of the container to achieve the desired rapid and uniform hydration of the product under the force of atmospheric pressure with the attendant benefits and advantages as more fully described in the aforesaid pending application.

The provision of the two types of seals, i.e., primary and secondary, offers unique and complementary advantages in a container of the type described for achieving a forced hydration of the container contents. The end closure of the container, affording the primary seal, provides a positive, permanent and substantially tamper-proof seal for the container during its shipment and storage prior to use of the container contents. The secondary seal provides a means whereby the vacuum in the container may be released easily and automatically while submerged or otherwise in fluid-tight communication with a hydrating liquid and without requiring special implements or devices for effecting vacuum release under such conditions. The end closure of the type described which comprises the primary seal also enables the container, or especially the end to be submerged, to be cleansed, such as by washing or the like, so as not to risk contamination of the hydrating liquid. This avoids the necessity of providing the container with a protective overwrap which otherwise would be required to serve the same purpose.

It is, therefore, an object of this invention to enable the easy release of vacuum in the presence of a liquid from a vacuum sealed container enclosing a hydratable product.

It is a further object of the invention to enable the easy release of a vacuum from a vacuum sealed container at a location thereof which is submerged in a body of liquid.

It is a further object of the invention to provide a container for hydratable products with an outer moisture-resistant vacuum seal and an inner moisture or liquid-sensitive vacuum seal.

It is a further object of the invention to provide a vacuumized container for hydratable products with a heat-resistant outer seal and a heat-sensitive inner seal.

Further objects of the invention together with the features contributing thereto and the advantages accruing therefrom will be apparent from the following description when read in conjunction with the drawing wherein.

Figure 1:
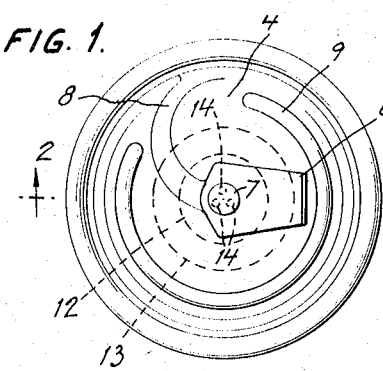
FIG. 1 is a plan view of a container embodying the present invention.
Figure 2:
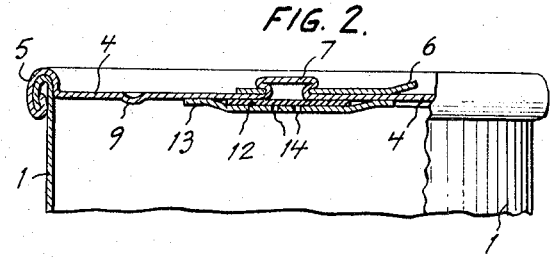
FIG. 2 is a view partly in section of the top end closure of the container, the section being taken along line 2—2 of FIG. 1.
Figure 3:
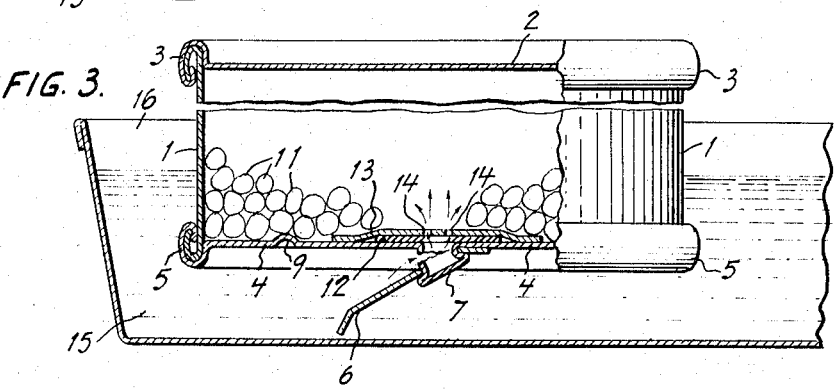
FIG. 3 is a view partly in section of the container inverted with its end closure submerged in a body of hydrating liquid.

Referring now to the drawing, FIGS. 1, 2 and 3 illustrate one embodiment of the invention making use of a rigid, preferably metal, container having a cylindrical body portion 1 sealed at one end by a bottom end closure 2 joined to the body portion 1 by rolled under edge portions defining a bottom chime 3, and sealed at the opposite end by a top end closure or lid 4 joined to the cylindrical body portion 1 in a similar manner by rolled under edge portions constituting a top chime 5. The cylindrical body portion 1 and the bottom closure 2 may be formed from any suitable sheet material customarily employed in containers, such as tin plate or the like. The top end closure or lid 4 is preferably made of aluminum and fabricated with an easy opening feature, commonly referred to as a "Whirlaway" top which enables the container to be opened and the lid removed without requiring any accessory device or implement.

This easy opening feature is achieved by attaching to the center portion of the closure 4 a pull tab 6. The attachment is formed by drawing the material of the lid upwardly through an aperture near one end of the pull tab and then flattening down the drawn material to form a protruding rivet 7, having a head portion which overlies a marginal surface area of the aperture of pull tab 6 and providing an inner bore which enables communication between the exterior and interior of the container in a manner to be hereinafter more fully described. A pair of weakened lines curving outwardly from the area of the rivet 7 to the periphery of the lid, and thence circumferentially around the periphery of the lid, define a tear strip 8. Preferably a groove 9 extending substantially around the end closure is provided for strengthening the structure of the lid.

The above described structure of the end closure may be considered as affording a primary seal for the container, it of course being understood that the container is packed with any suitable hydratable product, such as dried peas 11 or the like, and that the last to be applied end closure is sealed to the container when under vacuum so as to thereby maintain the product under vacuum until ready for use.

The easy opening "Whirlaway" type of closure just described enables opening of the container without requiring any accessory opening device or implement, said opening being effected by grasping the upturned end of the pull tab 6 and pulling upwardly thereon, which exerts sufficient force on the head of the rivet 7 to cause it to rupture and separate from the remaining portion of the lid, thus effecting a break of the primary seal afforded by the end closure. Continued pulling on the tab 6 upwardly causes the sheet material to tear away along the path defined by the tear strip 8 so as to achieve complete removal of the end closure, except for that portion thereof defining the chime, so as to permit removal of the container contents.

In accordance with the invention a secondary or inner seal is provided which is effective for maintaining the container contents under vacuum after the primary seal is broken at the rivet 7 by the initial pulling action of the pull tab 6 as above described. The secondary seal is comprised of a material which physically changes when in contact with the liquid employed for hydrating the product, which liquid when in contact therewith renders the material of the secondary seal ineffective as a sealing medium. In accordance with the embodiment of the invention shown in FIGS. 1, 2 and 3, the secondary seal may comprise a film 12 of a water soluble substance, such amylose starch or the like, applied to the underside of the end closure lid 4 in a position to seal off the path of communication between the interior and exterior of said container through the inner bore of the pull tab securing rivet 7. The water-soluble film 12 is firmly secured to the undersurface of the lid 4 by means of flexible tape or film having a larger diameter than that of the water-soluble film 12 and comprising a material which is heat-sealable or otherwise firmly adherable to the undersurface of the end closure lid 4. The securing tape or film 13 may comprise a foil laminate having a polyethylene coating, although several other types of flexible film material may be used, the only requirement being that such material be capable of maintaining a strong bond to the can lid so as not to rupture or separate therefrom under atmospheric pressure after the primary seal afforded by the end closure 4 has been broken in the manner aforementioned. Such other film materials which might be employed are a polyester/polyethylene combination, a K-type cellophane, or a cellophane/poly/foil/vinyl combination, or the like. The film 13 is provided with a plurality of perforations 14 disposed in vertical alignment with the interior bore of the rivet 7. The water-soluble film 13 is thus firmly adhered or secured to the underside of the lid 4 to act as an air-impenetrable barrier between the inner bore of rivet 7 and the perforations 14 in the supporting film 13 under the force of atmospheric pressure when the rivet 7 is ruptured by the initial pull on the tab 6 in the manner above described.

In the interest of clarity, cross hatching has been employed in the sectional views of the container structure and the films constituting the secondary seal, and it should be understood that in so doing the thickness of the respective parts as shown is somewhat exaggerated over their actual thickness.

To prepare the container contents for use, the free upturned edge of the pull tab 6 is grasped and elevated slightly from its normal position shown in FIG. 2 to the position where the rivet 7 ruptures, which is the position of the pull tab as shown in FIG. 3. Although this action breaks the primary seal afforded by the integral structure of the end closure or lid 4, the container contents remain under vacuum due to the provision of the secondary seal represented by the water-soluble film 12. The container is then inverted, and the end thereof provided with the end closure or lid 4 is submerged in a body of hydrating liquid 15 contained in a suitable vessel or receptacle 16 as shown in FIG. 3. The liquid is thus able to penetrate the end closure through the ruptured portion of the rivet and to come in contact with the now exposed surface of the film 12 which quickly dissolves to uncover the perforations 14 in the supporting film or tape 13. This provides a path of communication to the interior of the container through which the liquid is forced under atmospheric pressure to result in the forced hydration of the container contents. After allowing a sufficient time period for the admittance of the desired amount of liquid, during which time the interior pressure is restored to equilibrium with atmospheric pressure while the contained product is forcibly hydrated to its desired moisture content, the container is removed from the liquid and may then be fully opened to enable removal of the contained product. In cases where the end closure is of the "Whirlaway" type, the complete opening of the container can be effected merely by pulling upwardly on the tab 6 which severs the tear strip 8 from the lid, thus enabling complete removal of the lid or end closure. It should of course be understood that the invention is not limited to employment of a closure of the "Whirlaway" type, this merely being a preferred form of end closure. With end closures not having the severable tear strip of the "Whirlaway" type, the complete removal of the end closure to enable emptying the container of its contents may be achieved by means of any appropriate or conventional can opening device.

Figure 4:
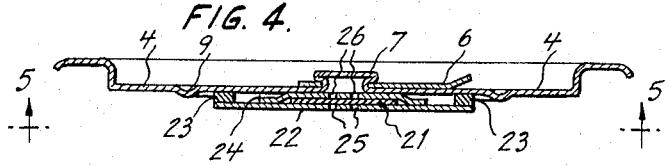
FIG. 4 is a sectional view of an end closure for a container illustrating another embodiment of the invention.
Figure 5:
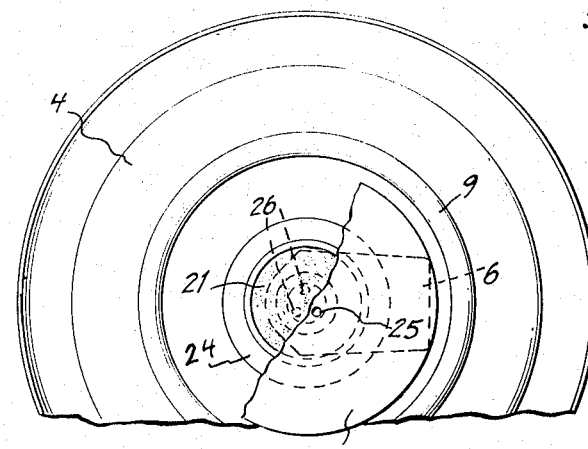
FIG. 5 is a bottom view of the end closure of FIG. 4 taken from the line 5—5 of FIG. 4.

FIGS. 4, 5 illustrate a modified form of the invention shown in conjunction also with a "Whirlaway" end closure or lid of the same type as above described in connection with the first embodiment, the lid in this instance being shown separately and before attachment to the body portion of the container. In this latter form of the invention the water-soluble film 21 is supported by a relatively rigid disc 22 of sheet metal or the like, the disc being secured about its outer marginal area to the undersurface of the closure 4 by an adhesive binder 23 which may be an epoxy resin or the like. The water-soluble film 21 is firmly secured to the disc 22 by an overlying film or tape 24 which may be of the pressure-sensitive type. Provided in the center area of the disc 22 are perforations 25 which are disposed in vertical registration with perforations 26 formed in the tape 24, said perforations 25, 26 lying in vertical alignment with the inner bore of the rivet 7. As in the first described embodiment, after the end closure 4 is initially ruptured by manually raising the tab 6, the water-soluble film 21 maintains a secondary vacuum seal by providing an air-impenetrable barrier between the perforations 25, 26 of the disc 22 and tape 24, respectively. However, when thereafter submerged in the hydrating liquid, the portion of the film 21 exposed to the liquid quickly dissolves, thereby providing a path of communication through the perforations 25, 26 to the interior of the container through which the liquid is forced by atmospheric pressure to achieve the forced hydration of the container product.

Figure 6:
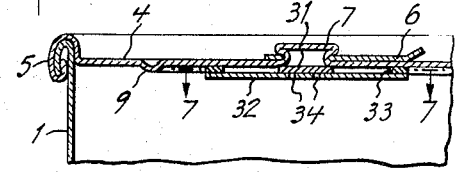
FIG. 6 is a sectional view through an end closure of a container representing a still further embodiment of the invention.
Figure 7:
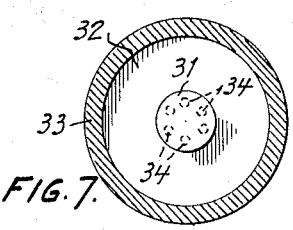
FIG. 7 is a detailed sectional view taken along line 7—7 of FIG. 6

A still further embodiment of the invention adapted for concurrent heating of the product is illustrated in FIGS. 6 and 7 which again utilizes, preferably, the "Whirlaway" type of end closure as employed in the previously described embodiments. In the case of the FIGS. 6 and 7 embodiment, the secondary seal comprises a film 31 of heat-shrinkable material such as polyvinylidene chloride or the like. The film 31 is supported on a disc 32 which is attached around its outer marginal surface to the undersurface of the end closure 4 by an adhesive binder 33 which may be a resin or the like. The central portion of the disc 32 is formed with a series of perforations 34 which, as can best be seen in FIG. 7 are arranged in a circular pattern, the pattern having a diameter slightly less than the diameter of the heat-shrinkable film 31. In this embodiment, when the end closure rivet 7 is ruptured by the initial raising of the pull tab 6, interior vacuum of the container is maintained by the air-impenetrable barrier provided by the film 31 covering the perforations 34. When the closure is subsequently submerged in a heated hydrating liquid, the film 31 reacts to the heat of the liquid by shrinking and thus exposes the perforations 34 which define a path of communication to the interior of the container through which the hydrating liquid is forced to achieve the forced hydration and heating of the container contents.

From the foregoing it will be apparent that the invention in each embodiment thereof provides a simple, inexpensive and relatively foolproof means whereby the interior vacuum of the container may be released at a discrete location thereof while in communication with a hydrating liquid to enable the forced hydration of the vacuum packed product while still in the container. The invention eliminates the need for any special tools or implements which otherwise would be required to effect the puncture of the container below the surface of the liquid in which it is submerged. By placing the secondary seal, whether it be of a water-soluble or a heat-shrinkable substance, within the container, it is protected during handling and storage against moisture, contamination and physical abuse by the primary seal represented by the metal lid or end closure of the container.

While there have been shown and described what are considered to be preferred embodiments of the invention, it of course will be understood that obvious changes in form could be made without departing from the spirit of the invention. It is therefore intended that the invention be not limited to the exact forms herein shown and described nor to anything less than the whole of the invention as hereinafter claimed.

I claim:

1. A container for use in packaging and hydrating a liquid combinable product comprising, an elongate tubular body portion of air and moisture-impervious packaging material, end closures of similar packaging material joined to said body portion to define therewith a vacuum sealed enclosure, one of said end closures being formed with means manually actuable to rupture the material of said one end closure at a discrete area thereof, and means disposed in sealing relation to said discrete area for maintaining a vacuum seal for said container after the said one end closure is ruptured by said manually actuable means, said vacuum maintaining means including a substance physically changeable to a nonsealing state when in contact with a product hydrating liquid to permit admittance of said liquid into said container when said one end closure, after being ruptured, is placed in fluid-tight communication with said liquid.

2. The invention according to claim 1 wherein said manually actuable means includes a pull tab joined to said one end closure at said discrete area thereof.

3. The invention according to claim 1 wherein said manually actuable means includes a pull tab member attached to said one end closure by a rivet formed in said one end closure at said discrete area thereof.

4. The invention according to claim 3 wherein said one end closure is formed with a pair of weakened lines extending outwardly from said discrete area and peripherally around said one end closure to define a tear strip severable along said weakened lines from the remaining portion of said one end closure.

5. A container for use in packaging and hydrating a liquid combinable product comprising, an elongate tubular body portion of relatively rigid packaging material, end closures of similar packaging material joined to said body portion to define therewith a vacuum sealed enclosure, one of said end closures being formed with means manually actuable to rupture the material of said one end closure at a discrete area thereof, said one end closure constituting a primary vacuum seal for said container, and means disposed interiorly of said container and in sealing relation to said discrete area for maintaining a secondary vacuum seal for said container and effective as such after said one end closure is ruptured by said manually actuable means, said seal maintaining means including a member hermetically joined to the interior surface of said one end closure over a surface area encompassing said discrete area and including a substance physically changeable to a nonsealing state when in contact with a product-hydrating liquid, whereby said liquid when under a pressure greater than the interior pressure of said container is forcibly admitted into said container to forcibly hydrate said product when said one end closure, after being ruptured, is submerged in said liquid.

6. The invention according to claim 5 wherein said member is formed with a perforate area and said physically changeable substance is in the form of a film disposed in sealing relation to said perforate area.

7. A container for use in packaging and hydrating a liquid-combinable product comprising, an elongate tubular body portion of air and moisture-impervious packaging material, end closures of similar packaging material joined to said body portion to define therewith a vacuum-sealed enclosure, one of said end closures being formed with means manually actuable to rupture the material of said one end closure at a discrete area thereof, and means disposed in sealing relation to said discrete area for maintaining a vacuum seal for said container after the said one end closure is ruptured by said manually actuable means, said vacuum maintaining means including a water-soluble substance which, when in contact with a product hydrating liquid, dissolves to permit admittance of said liquid into said container when said one end closure, after being ruptured, is placed in fluid-tight communication with said liquid.

8. The invention according to claim 7 wherein said water-soluble substance is in the form of a film supported interiorly of said one end closure in a position to prevent free communication between said discrete area and the interior of said container.

9. The invention according to claim 8 wherein said film is supported by a member having a perforate area and secured to the inner surface of said one end closure over a surface area encompassing said discrete area, said film being disposed in sealing relation to the perforate area of said member.

10. The invention according to claim 7 wherein said water-soluble substance is in the form of a film and is supported by a flexible tape having a perforate area, said tape being adhesively secured to the inner surface of said one end closure over an area encompassing said discrete area, said film being disposed in sealing relation to said perforate area to prevent free communication from said discrete area of said one end closure into the interior of said container.

11. The invention according to claim 7 wherein said water-soluble substance is in the form of a film supported interiorly of said container by a disc having a perforate area and secured by an adhesive binder to the inner surface of said one end closure over an area encompassing said discrete area, said film being disposed in sealing relation to said perforate area of said disc to prevent free communication from said discrete area of said one end closure into the interior of said container.

12. The invention accoridng to claim 11 wherein said film is secured to said disc by an adhesive member having a perforate area registering with the perforate area of said disc.

13. A container for use in packaging and hydrating a liquid-combinable product comprising, an elongate tubular body portion of air and moisture-impervious packaging material, end closures of similar packaging material joined to said body portion to define therewith a vacuum sealed enclosure, one of said end closures being formed with means manually actuable to rupture the material of said one end closure at a discrete area thereof, and means disposed in sealing relation to said discrete area for maintaining a vacuum seal for said container after the said one end closure is ruptured by said manually actuable means, said vacuum maintaining means including a heat-shrinkable substance which, when in contact with a heated product hydrating liquid, shrinks to permit admittance of said liquid into said container when said one end closure, after being ruptured, is placed in fluid-tight communication with said liquid.

14. The invention according to claim 13 wherein said heat-shrinkable substance is in the form of a film and is supported by a perforate member secured to the inner surface of said one end closure over an area encompassing said discrete area, said film having a surface area greater than the perforate area of said supporting member to maintain a seal between the discrete area of said one end closure and the interior of said container, said film when in contact with said heated liquid shrinking to a surface area less than that of said perforate area to permit admittance of said liquid through said perforate area into the interior of said container.

15. The invention according to claim 14 wherein said perforate area of said supporting member and said film is circular, said film being disposed concentrically to said perforate area.

References Cited by the Examiner

UNITED STATES PATENTS

| | | | |
|---|---|---|---|
| 991,354 | 5/1911 | Parent | 99—171 |
| 1,464,273 | 8/1923 | Schooflocher | 220—20.5 |
| 2,288,895 | 7/1942 | Fink | 220—20.5 |
| 2,307,043 | 1/1943 | Hothersall | 99—182 X |
| 2,358,598 | 9/1944 | Scherer | 99—171 X |
| 2,633,284 | 3/1953 | Moffett et al. | 206—46 X |
| 2,667,423 | 1/1954 | Simpson | 220—29 X |
| 3,071,281 | 1/1963 | Sawai | 220—29 X |

FOREIGN PATENTS

| | | |
|---|---|---|
| 544,111 | 7/1957 | Canada. |
| 438,261 | 4/1912 | France. |
| 1,130,591 | 2/1957 | France. |

THERON E. CONDON, *Primary Examiner.*

R. A. JENSEN, *Assistant Examiner.*